June 19, 1945. Z. DE LUBICZ-BAKANOWSKI ET AL 2,378,840
TRAINING DEVICE COMPRISING DUMMY GUNS
Filed Nov. 29, 1943 9 Sheets-Sheet 1
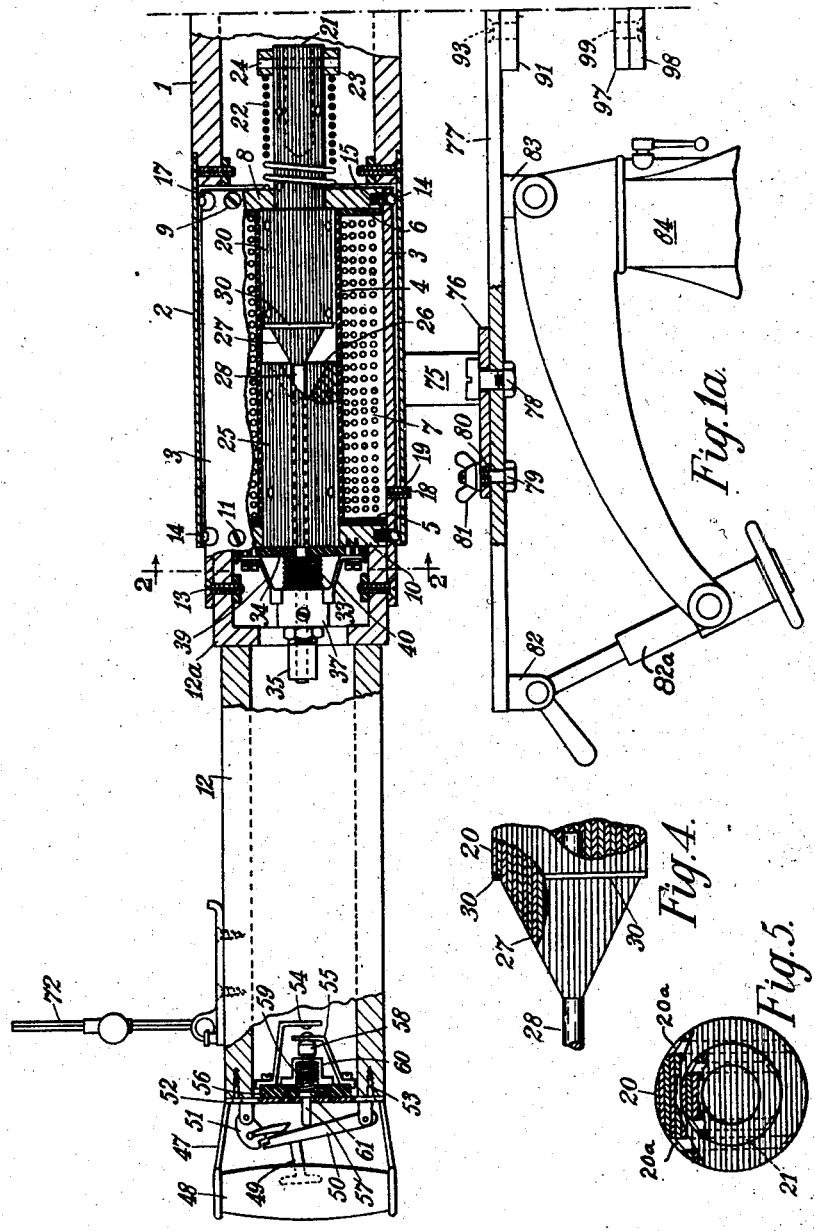
Inventors
Z. de Lubicz-Bakanowski
R. Suk
By Liscoch Downing Seebold
Attys.

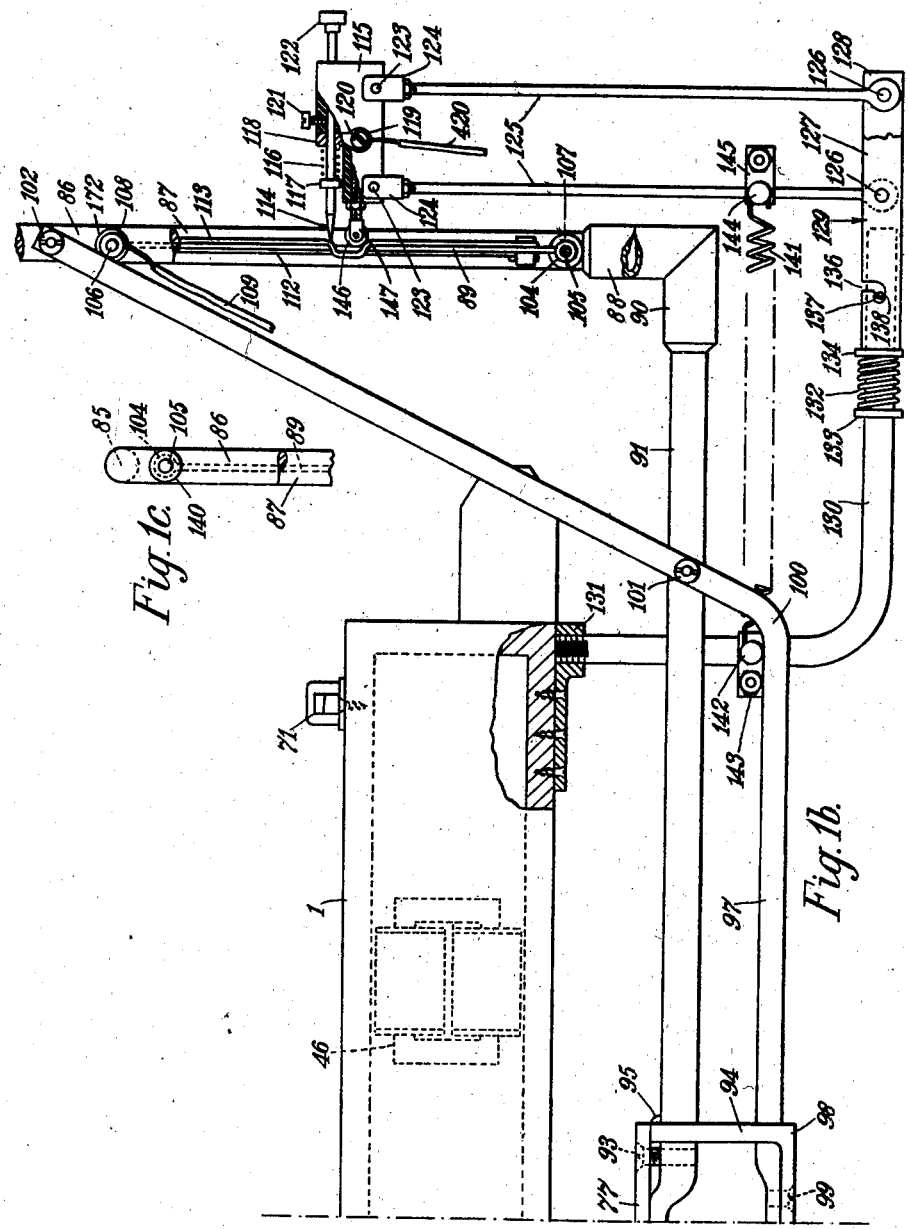

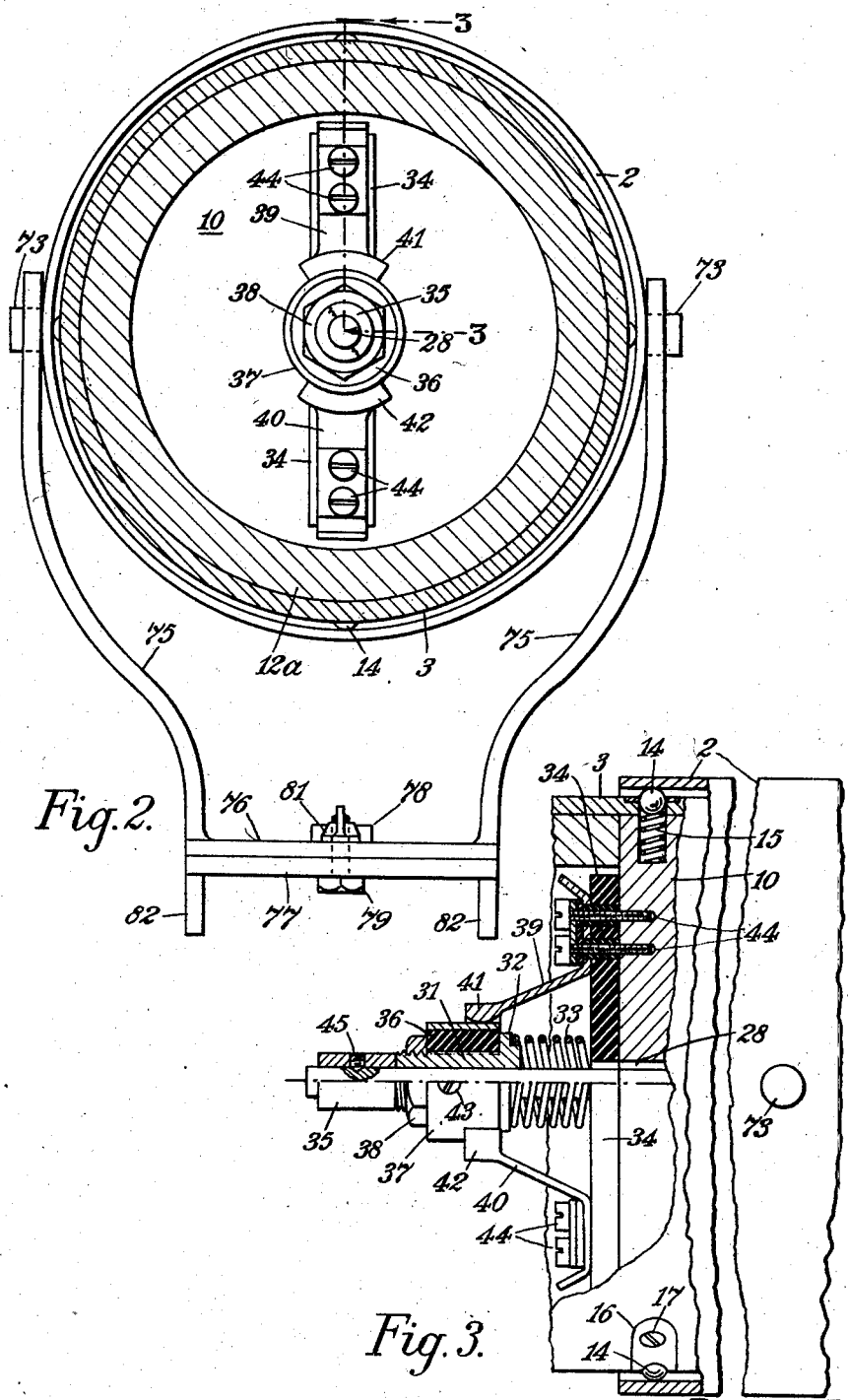

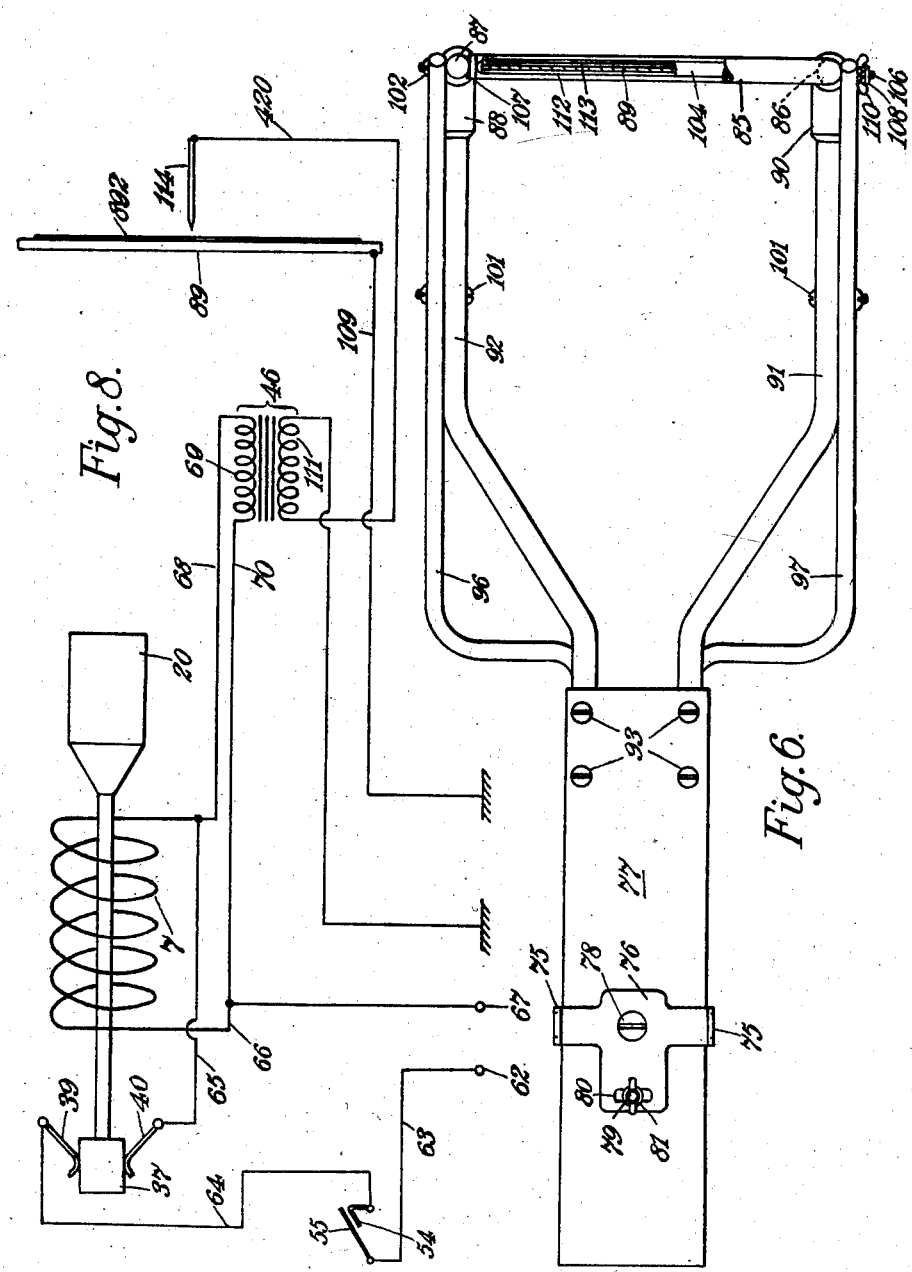

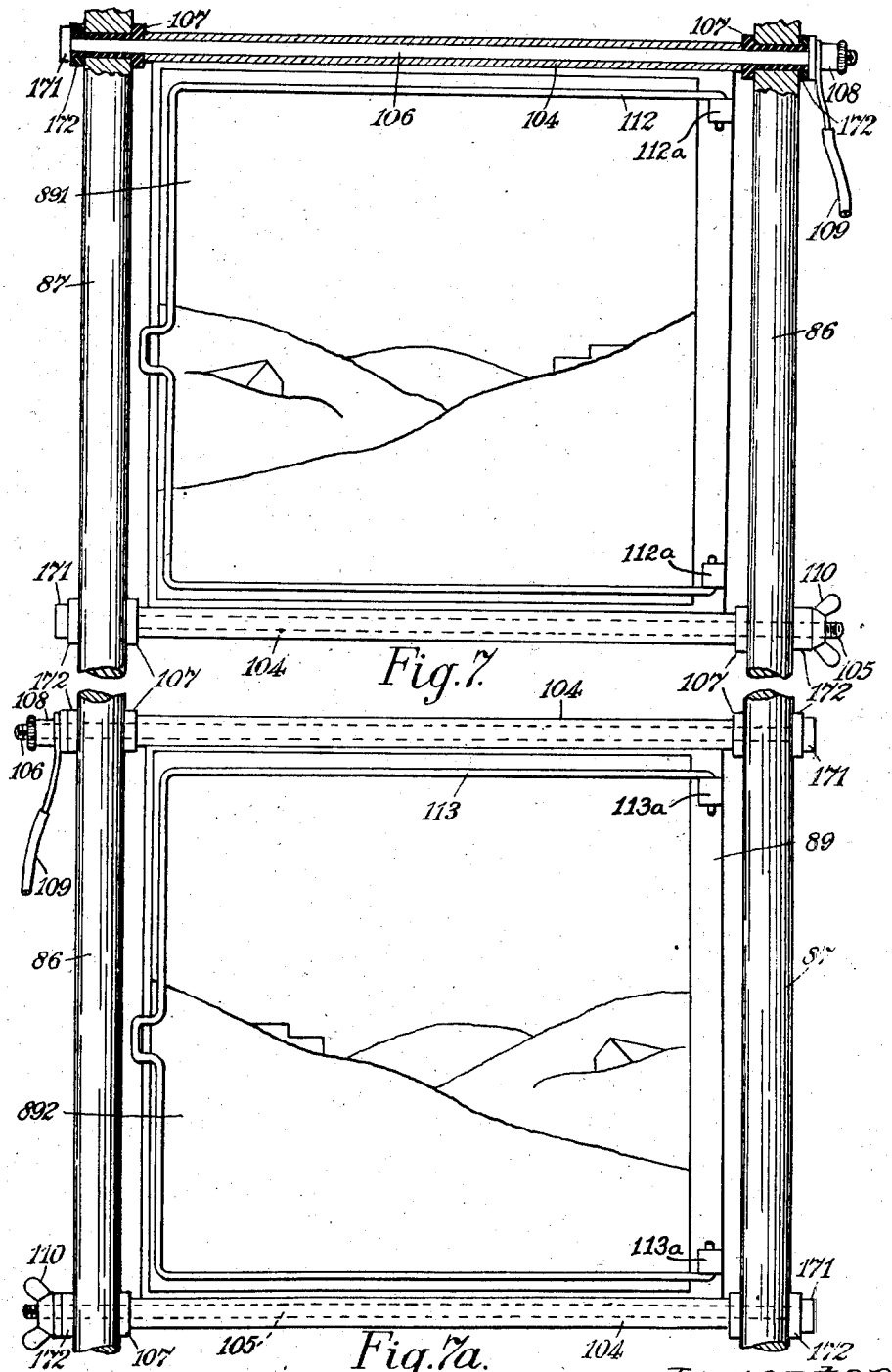

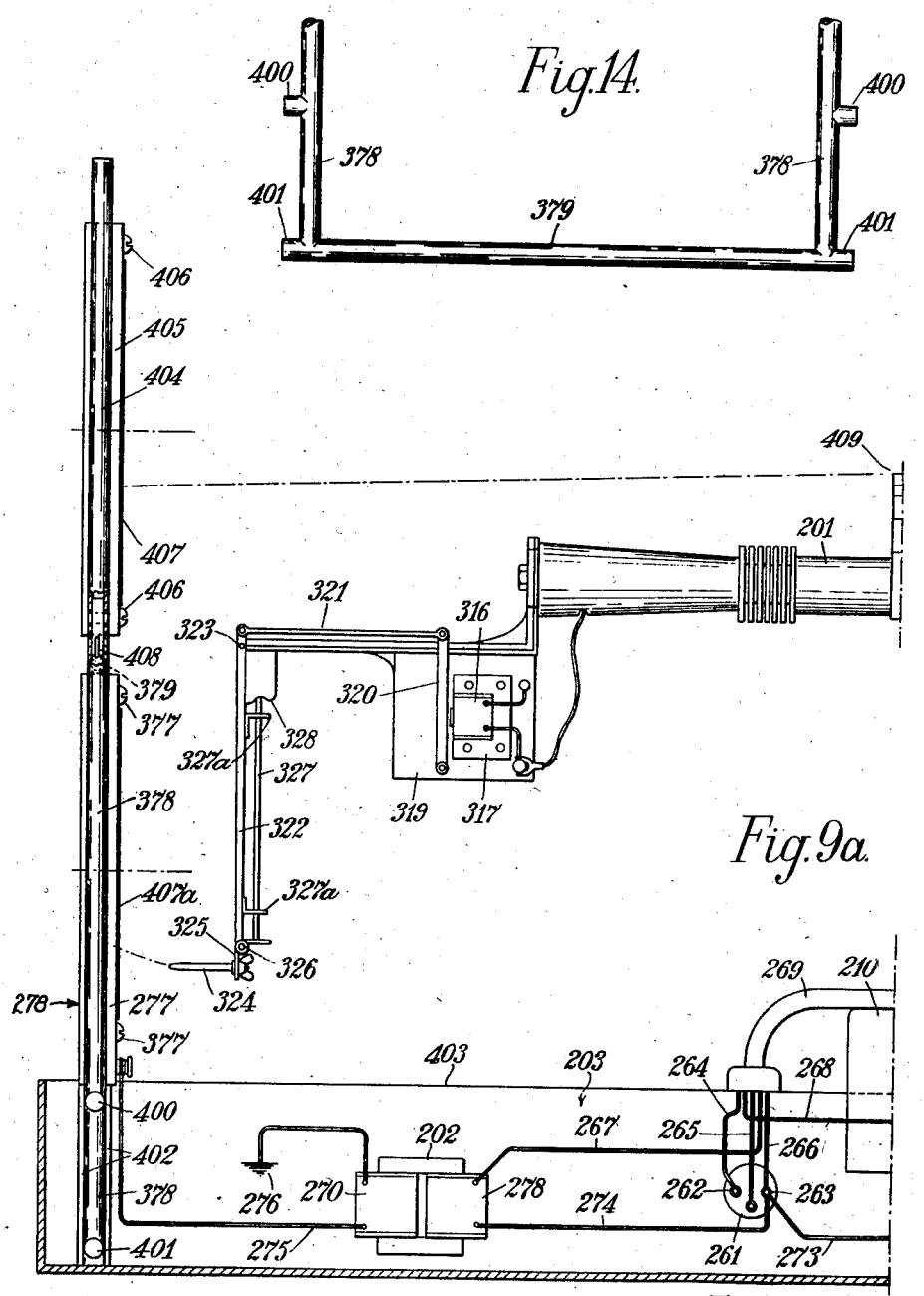

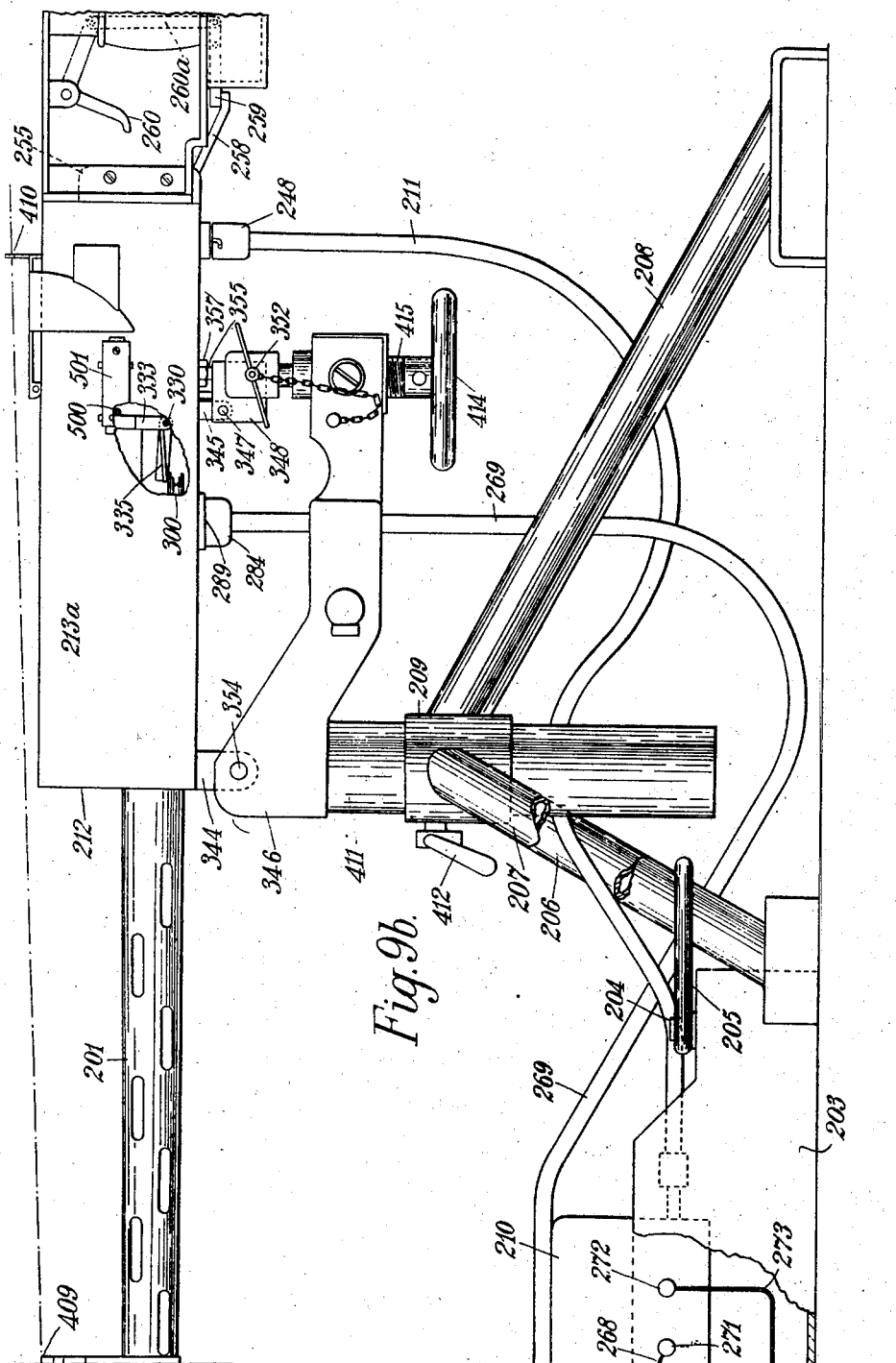

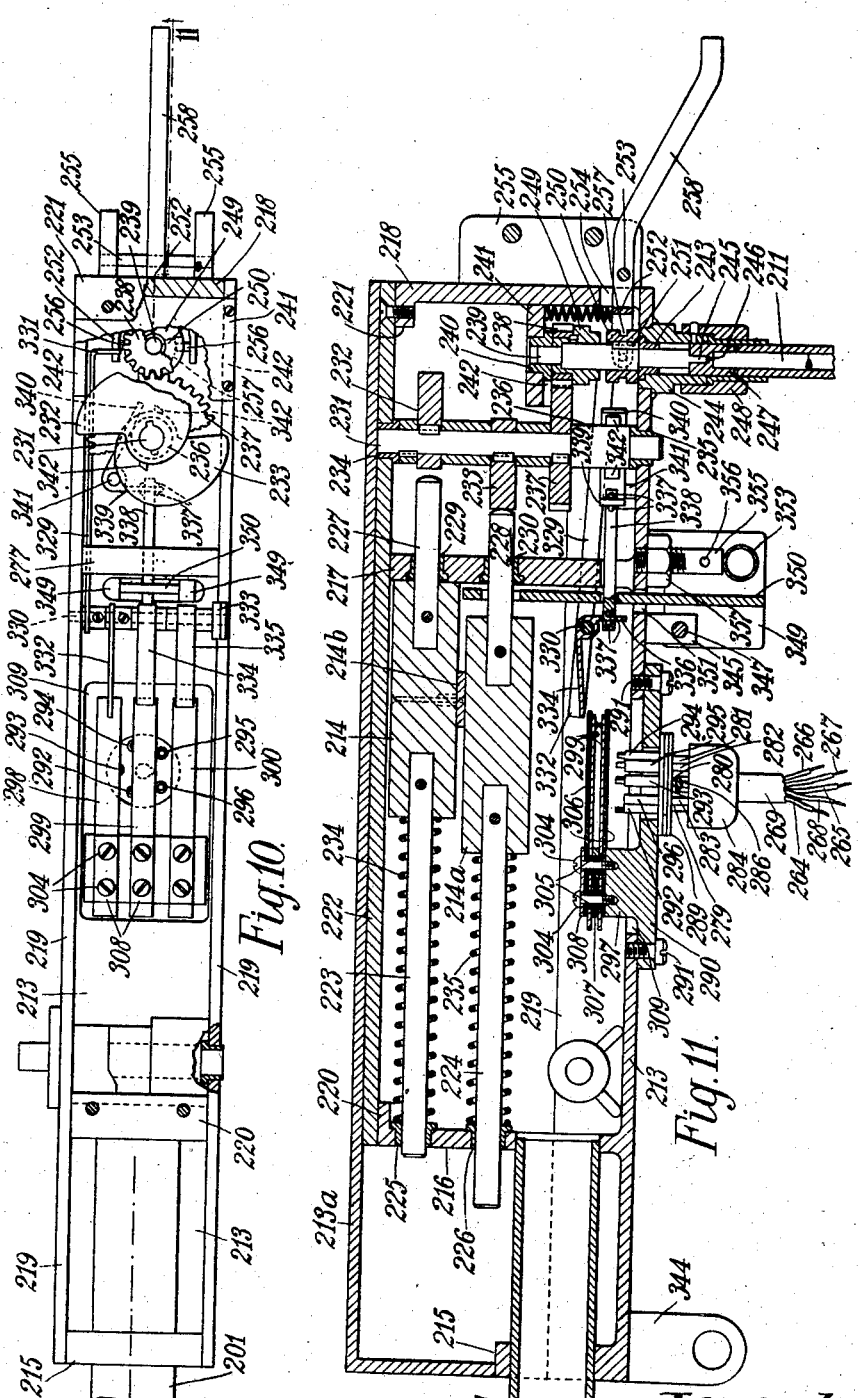

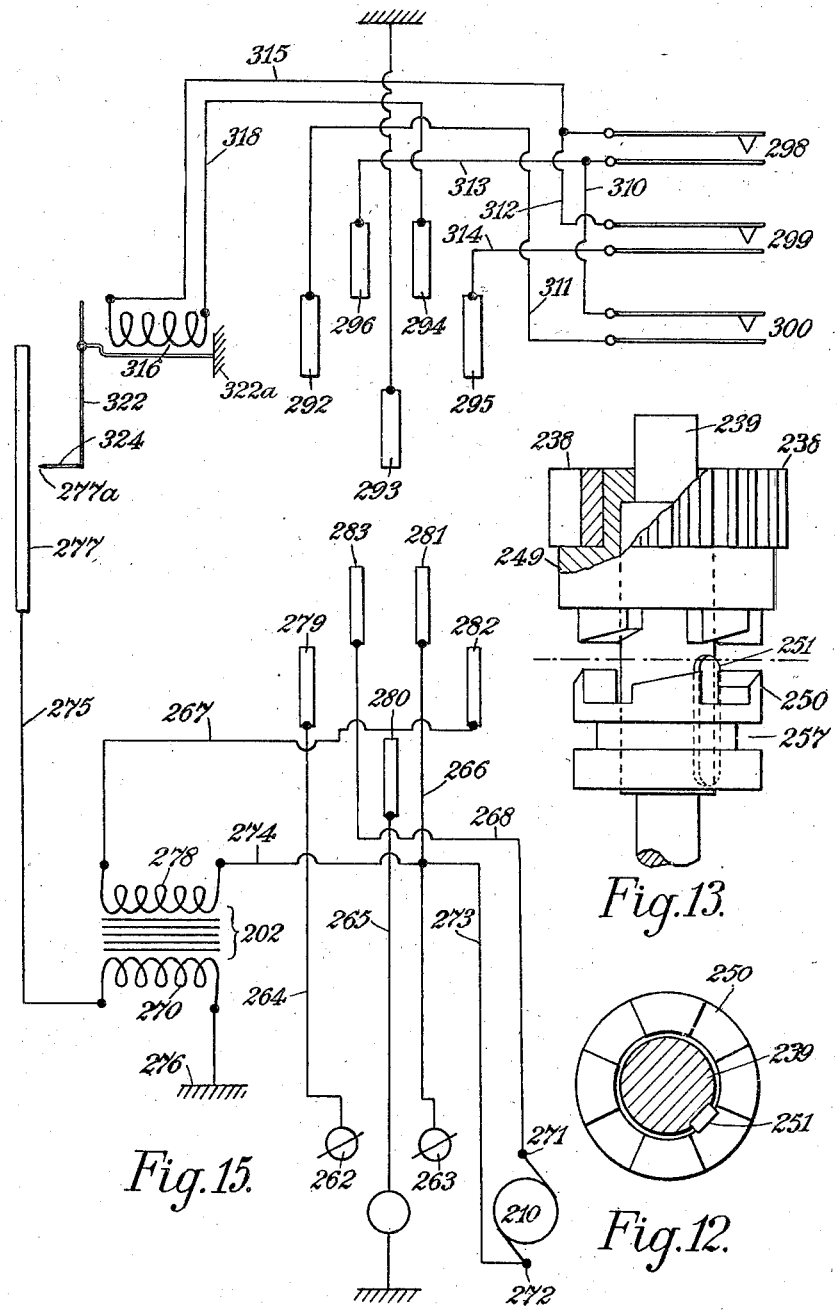

Patented June 19, 1945

2,378,840

UNITED STATES PATENT OFFICE 2,378,840

TRAINING DEVICE COMPRISING A DUMMY GUN

Zygmunt de Lubicz-Bakanowski and Richard Suk, Oxford, England

Application November 29, 1943, Serial No. 512,268
In Great Britain September 12, 1942

10 Claims. (Cl. 35—25)

This invention relates to training devices comprising a dummy rifle. Such training devices are known in which after cocking the rifle and on pulling the trigger a rod disposed in the rifle and having a pointed piercing end is projected from the rifle to pierce a target with which the rifle is operatively associated.

The object of the present invention is to provide apparatus suitable for training recruits in the use of automatic guns.

With this object in view a training apparatus made according to the present invention comprises a dummy machine gun, a target carrier operatively associated with the dummy machine gun, a target marking member arranged exteriorly of the gun and adapted to be moved over the target in conformity with the movement of the gun whilst sighting the gun, and means for repeatedly rendering the target marking member operative to mark the target at one or more points while the trigger is maintained in the operative position.

The means for rendering the target marking member operative may comprise: an electric control circuit arranged to be repeatedly closed and opened while the trigger is in its operative position, and an electric marking circuit in which the target marking member and target carrier are included and which is arranged to be supplied with electrical impulses when the control circuit is closed. The recording circuit may comprise a transformer for stepping up the voltage of the current impulses.

The means for repeatedly making and breaking the control circuit may comprise an electromagnet the winding of which forms part of the control circuit and the core of which is movable and carries a switch member adapted, when the trigger is held in the operative position, to be moved by the core to open the control circuit, and spring means for returning the movable core and switch member to close again the control circuit, as often as the latter is broken until the trigger is released.

Means may be provided on the dummy gun for imitating the noise and vibration produced in the firing of a real automatic gun. According to one construction this may be effected by arranging for a surface to be impacted by the movable core of the electromagnet at the ends of its movements, the impacts being transmitted to the rear portion of the gun body which is handled by the trainee and to which the electromagnet is connected.

The target sheet at which aim is taken by the trainee may be a mirror image of a target sheet on which the marking is to be recorded, the two target sheets being arranged back to back on the target carrier with the two target sheets in accurate alignment, the mirror image target sheet facing the trainee.

The target sheet on which the mark is to be recorded may be disposed between two electrodes in the marking circuit one of said electrodes constituting the marking member, and the marking on the target sheet may be effected by spark discharges between these electrodes produced by the electrical impulses in the marking circuit.

The two target sheets may be mounted on opposite sides of a metal plate constituting the target carrier and being one of the electrodes in the marking circuit.

The target carrier is disposed vertically on a frame connected to the tripod on which the gun is mounted, and is located near the muzzle end of the gun so that aim can be taken at any point on the target. As the gun is sighted on the aiming target by moving the gun on its tripod in the customary way, the marking electrode follows accurately the movements of the gun over the recording target sheet.

According to a modified form of construction, use is made of an electric motor to drive a cam, which repeatedly closes and opens an electric control circuit so long as the trigger is in its operative position, the electric marking circuit being under the control of the said electric control circuit. The electric motor is also arranged to drive a cam which is in its turn acts on a movable impact member arranged to strike against a fixed impact surface on the gun in order to imitate the noise and vibration produced in the firing of a real automatic gun.

The invention is illustrated by way of example in the accompanying drawings, in which Figures 1a and 1b show a side elevation partly in longitudinal section of one embodiment of the apparatus according to the invention; Figure 1c being a broken off continuation of the target frame included in Figure 1b;

Figure 2 is a cross-section on a larger scale of a detail of the gun on the line 2—2 of Figure 1a showing in end elevation the means for attaching the gun to the tripod head, the elements in the interior of the gun being also shown in end elevation;

Figure 3 is a side elevation of the detail shown in Figure 2 partly in longitudinal section on the line 3—3 of Figure 2;

Figures 4 and 5 are fragmentary side and front end elevations, respectively on a larger scale of the magnetic plunger with parts removed;

Figure 6 is a plan view of the target frame;

Figures 7 and 7a are detail views of the opposite sides of a target carrier showing aiming and recording targets, respectively, attached in position thereon;

Figure 8 is a circuit diagram showing the connections of electrically operated mechanism enclosed in the body of the gun, of electrical means for marking the recording target and of devices for controlling the said mechanism and marking means;

Figures 9a and 9b are a side elevation of a second embodiment of the invention;

Figure 10 is a top plan view on a larger scale of the rear part of the body of the gun, certain of the parts being removed to show the enclosed mechanism;

Figure 11 is a longitudinal section on the line 11—11 of Figure 10;

Figures 12 and 13 show a bottom plan view and side elevation, respectively, of a detail;

Figure 14 is an elevation of a portion of the target frame; and

Figure 15 is a circuit diagram showing the connections of the electrically operated means for actuating the mechanism enclosed in the body of the gun and for marking the recording target, and of the devices for controlling the operation of the said means.

In the embodiment of the invention shown in Figures 1 to 8 the dummy machine gun resembles a medium Vickers machine gun, having sighting means and trigger mechanism similar to that of the Vickers gun. The front part 1 of the body of the gun, which corresponds to the barrel casing of the Vickers gun, has the sleeve 2 of sheet metal attached to it at its rear end, the said sleeve housing an electromagnetic device with movable core comprising an outer shell 3 and an inner shell 4 having flanges 5, 6 between which is accommodated a solenoid winding 7. The flange 6 abuts against a bearing plate 8 which closes the forward end of the outer shell 3 and is attached to the latter by means of screws 9, and the flange 5 abuts against a bearing plate 10 which is inserted inside the outer shell 3 and is attached to the latter by means of screws 11. The electromagnetic device is mechanically attached to the rear part 12, 12a of the body of the gun so as to constitute an extension thereof, the outer shell 3 extending rearwardly beyond the bearing plate 10 and receiving the forward end 12a of the part 12 to which it is secured by means of screws 13. The outer shell 3 is of smaller diameter than that of the sleeve 2 and is provided with apertures to receive balls 14 which are pressed outwardly so as to bear against the inner wall of the sleeve 2 by means of springs 15 housed in cavities provided in the peripheries of the plates 8 and 10, the said balls as shown in Figure 3, being retained in position by means of retaining plates 16 secured to the outer shell 3 by means of screws 17. The electromagnetic device is retained inside the sleeve 2 by means of a pin 18 screwed into the outer shell 3, the said pin passing through a slot 19 in the sleeve 2 which permits of a limited amount of sliding motion of the device relatively to the front part 1 of the gun body.

A plunger 20 formed of laminations of magnetic material which are secured together by means of rivets 20a as shown in Figure 5, is slidable inside the inner shell 4. The said plunger, which forms a movable core for the electromagnetic device, is provided with a forward part 21 of reduced diameter which passes through the bearing plate 8 and is encircled by a coil spring 22, one end of which bears against the bearing plate 8 and the other end against a collar 23 which is secured to the part 21 by means of a pin 24. The part 21 of the plunger is made hollow. Inside the rear portion of the inner shell 4 is located a hollow fixed core 25 comprising laminations of magnetic material which are secured together by means of rivets in a similar manner to the movable core 20, the bearing plate 10 being shrunk on to the rear end of the core 25. The forward end of the fixed core 25 is provided with a conical depression 26 and the rear end of the movable core 20 is formed with a corresponding conical extension 27 which is adapted to move into the depression 26. The conical extension 27 is axially bored to receive the end of a spindle 28 which extends through the hollow fixed core 25 and through the bearing plate 10, the said spindle being secured to the extension 27 by soldering. Forward movement of the plunger is limited by the bearing plate 8, and rearward movement thereof by the fixed core 25 against which the plunger 20 abuts with a thin ring 30 of non-magnetic material forced on to a shoulder formed at the base of the conical extension 27.

The spindle 28 carries at its rear end a metal sleeve 31 (see Figures 2 and 3), which is slidable axially on the spindle and has a flange 32. On the rear face of the bearing plate 10 is fixed a contact-carrying plate 34 of insulating material between which and the flange 32 is interposed a coil spring 33 which encircles the spindle 28 and urges the sleeve 31 rearwardly, the rearward motion of the sleeve being limited by means of a collar 35 fixed on the spindle 28. The metal sleeve 31 carries a bush 36 of insulating material (see Figure 3) on which is secured (by means of a screw 43) a metal sleeve 37 constituting a cylindrical switch member, the bush 36 being clamped between the flange 32 and a nut 38 which is screwed on the sleeve 31. The plate 34 carries two spring contact members 39, 40 having arcuate end pieces 41, 42 which are adapted to co-operate with the cylindrical sleeve 37. The contact members 39, 40 are fixed to the plate 34 by means of screws 44 which pass right through the plate 34 and serve at the same time for securing the latter to the bearing plate 10, insulating material being interposed between the heads and shanks of the screws 44 and the contact members 39, 40. The axial position of the cylindrical switch member 37 with respect to the spring contacts 39, 40 can be adjusted by varying the axial position of the collar 35, which is fixed on the spindle 28 by means of a set-screw 45. The spring contact members 39, 40 and the sleeve 37 constitute switching means for controlling the supply of current to the solenoid winding 7 and to a step-up transformer 46 mounted in the front part 1 of the gun for supplying high tension current to a marking device hereinafter described.

The current supply to the solenoid winding 7 and the transformer 46 is also controlled by a switch which is actuated by the trigger mechanism which comprises a rear cross-piece 47 with grips 48, a thumb-piece 49, firing lever 50 and safety catch 51, all mounted on a metal plate 52 which is attached to the rear end of the part 12 of the body of the gun by means of screws 53. The switch actuated by the trigger mechanism comprises two resilient contact members 54, 55 which are fixed on a plate 56 of insulating material screwed on the plate 52. The contact member 55 is moved into engagement with the contact member 54 by means of a plunger 57 having a cap of insulating material 58 at its forward end and the rear end of which bears against the firing lever 50. The plunger 57 is normally retained in its rearmost position, in which the contact member 55 is separated from the contact member 54, by a coil spring 59, one end of which bears against a stirrup-shaped abutment member 60 fixed on the plate 56 and the other end against a collar 61 fixed on the plunger 57.

The electrical connections illustrated in Figure 8 are as follows: from one pole 62 of a source of current (not shown), e. g. an electric supply system, through a conductor 63, contact member 55, contact member 54, conductor 64, contact member 39, sleeve 37, contact member 40; through a conductor 65 to the solenoid winding 7 and through a conductor 66 to the other pole 67 of the source of current. The primary 69 of the transformer 46 is connected in parallel with the solenoid 7 by conductors 68 and 70.

The gun body is provided with trunnions 73 (see Figure 2) which are fixed to the sleeve 2 and are journalled in a pair of upright members 75 integral with a plate 76 pivoted on a base-plate 77 by means of a pivot bolt 78, whereby the gun can be swivelled about a vertical axis on the said base-plate, as well as tilted about the axis of the trunnions 73. The swivelling motion of the gun is limited by means of a bolt 79 which is a loose fit in a slot 80 (Figure 1a) in the swivel plate 76 and is provided with a wing-nut 81, the base-plate 77 being provided with lugs 82, 83. The lug 83 connects the base plate to the tripod head 84 and the lug 82 is connected with a conventional adjusting device 82a.

The gun is also provided with a foresight 71 and a backsight 72 so as to enable the operator to train the gun on a target, hereinafter referred to as the aiming target, located in proximity to the muzzle of the gun, the swivelling and tilting motions of the gun enabling aim to be taken at any point on the aiming target.

The aiming target is carried by a target carrier 89 mounted on a frame comprising a stirrup-shaped structure having a top horizontal portion 85 (Figure 1c) and two downwardly extending limbs 86, 87 (Figures 1b, 7 and 7a) which are connected by means of angle pieces 88, 90 to two horizontal bars 91, 92 which extend rearwardly towards the base-plate 77 and are attached thereto by screws 93. The bars 91, 92 pass through one side 94 of an angle-section piece 94, 98 and are welded thereto at 95. The target frame is stiffened by means of a pair of stiffening elements 96, 97 which are also passed through the side 94 of the angle-section piece and are secured to the side 98 of the latter by screws 99. The stiffening elements 96, 97 are bent upwardly at 100 and are secured to the bars 91, 92 by bolts 101, and at their upper ends to the upright limbs 86, 87 by bolts 102. The target carrier 89 (Figures 7 and 7a) consists of a metal plate having tubular members 104 integral therewith extending anlong its upper and lower edges, the said tubular members being adapted to receive rods 105, 106 which are provided with heads 171, and are passed through insulating bushes 107 fitted in the limbs 86, 87. The rod 105 is provided with a wing nut 110 for securing it in position, the rod 106 being secured in position by means of a nut 108. Insulated washers 172 are interposed between the side members 86, 87 and the heads 171 and nuts 108, 110, respectively. The nut 108 also serves for clamping an insulated conductor 109 to the rod 106, the said conductor being connected to one end of the secondary 111 of the transformer 46 (see Figure 8). A wire frame 112 hinged to the plate 89 at 112a serves for removably securing the aiming target 891 to the said plate (see Figure 6). A similar wire frame 113 hinged to the plate 89 at 113a, on the other side of the plate, that is to say on the side thereof facing away from the operator serves for securing a second target 892 (see Figure 7a) hereinafter referred to as the recording target, to the carrier plate 89. The portion of the target frame 85, 86, 87 lying above the plate 89 when the aiming target is in operative position is sufficiently high to enable the target carrier 89, after removal of the lower rod 105, to be swung upwardly around the rod 106, into a top position, indicated by dotted lines in Figure 1c, between the upper extremities of the upright limbs 86, 87, so as to leave the bottom space between the said limbs clear and unobstructed. The target carrier 89 is retained in the top position as long as may be desired by inserting the rod 105 through the uppermost tubular member 104 and through insulating bushes 140 fitted in the upper ends of the limbs 86, 87, see Figure 1c.

The recording target is marked by means of a marking member (Figure 1b) comprising needle electrode 114 which is displaceable axially in a needle block 115 of insulating material against the force of a spring 116, one end of which bears against a collar 117 integral with the needle electrode 114 and the other end against a metal abutment member 118 which backs against a shoulder of the needle block 115. The abutment member 118 is provided with a depending lug 119 through which is passed a screw 120 which is screwed into the block 115 and serves for securing the member 118 thereto. An insulated conductor 420 connected to the other end of the transformer secondary 111 serves for supplying high tension current to the needle electrode 114, the said conductor being secured between the screw 120 and the lug 119 of the abutment member 118. The needle electrode 114 is provided with a knob 122 of insulating material for enabling it to be adjusted axially in the block 115 and is secured in its adjusted position by means of a screw 121 which is screwed into the block 115. The needle block is carried by pivot pins 123 on forked members 124 screwed on the upper ends of a pair of upright rods 125, the lower ends of which are pivotally mounted on bearing pins 126 fixed at their ends in the limbs 127, 128 of a fork member 129 which is bored axially to receive the end of a supporting arm 130 having a threaded end 131 which is screwed to the underside of the muzzle end of the gun body. A coil spring 132 interposed between a collar 133 on the arm 130 and a flange 134 on the rear end of the fork member 129 tends to force the latter off the end of the said arm but is prevented from doing so by means of a pin 137 which is screwed into the arm 130 and engages in a circumferential slot 136 having an offset part 138. Normally, the pin 137 is located in the offset part 138 of the slot, thereby maintaining the rods 125 in the position shown with the needle electrode 114 located so as to be capable of marking the recording target. The needle block is urged towards the recording target by means of a coil spring 141, one end of which is hooked over a button 142 on a clip 143 attached to the arm 130 and the other end of which is hooked over a button 144 on a clip 145 attached to one of the rods 125. A guide roller 146 (Figure 1b) journalled in a carrier which is screwed into the needle block 115 immediately below the needle electrode is pressed by the spring 141 against the recording target on the plate 89, whereby the needle block is maintained in a constant spaced relationship with respect to the recording target, the rods 125 ensuring that the needle electrode is located exactly at right angles to the target. It will be obvious from the foregoing description that when the gun is moved over the aiming target the needle electrode will follow the movements of the gun and for every point aimed at on the aiming target, the needle electrode 114 will be located opposite a definite point on the recording target. As the recording target is arranged at the back of the aiming target, the former has to be a mirror image of the latter, being so adjusted that when the sighting means are aligned on any particular object on the aiming target the needle electrode 114 is always located opposite the corresponding object on the recording target, following accurately the movements of the gun as the latter is moved over the aiming target.

By pressing the fork member 127 rearwardly against the force of the spring 132, the pin 137 is withdrawn from the offset part of the slot 136, thereby enabling the fork member, together with the parts carried by it, to be turned around the end of the arm 130 and the needle electrode 114 to be swung aside from the target carrier 89, so that when the latter is moved into its top position as above described, the gun can be aimed at actual targets through the space between the uprights 86, 87 below the bottom of the target carrier.

The needle 114 and the plate 89 form a pair of electrodes between which the recording target is interposed, and in order to enable the latter to be marked, the needle is adjusted so that a small air gap separates the free end thereof from the target, the marking being effected by a spark discharge which scorches the paper target.

The operation of the mechanism described is as follows:

Normally the movable core 20 is in its forward position and the contact members 39, 40 in contact with the sleeve 37. When the trigger mechanism is actuated by means of the thumb-piece 49 in the way which would fire an ordinary gun, the solenoid and the transformer primary circuits are closed by the switch 54, 55. As a result of closing the solenoid circuit the movable core 20 travels rearwardly in the solenoid winding 7 thereby moving the sleeve 37 from the position shown into a position out of contact with the contact member 39, 40 and opening the solenoid and transformer circuits. The spring 22 of the movable core 20 is compressed by the rearward movement of the latter but as soon as the solenoid is de-energised by its circuit being opened the spring forces the movable core forward again to its initial position, the solenoid and transformer primary circuits being then again closed. During the forward movement of the movable core the spring 33 associated with the cylindrical sleeve 37 is compressed against the contact carrying plate 34, its subsequent expansion serving to accelerate the next rearward movement of the core member 20 and the consequent breaking of the contact between the sleeve 37 and the contact members 39, 40. Thus, while the trigger mechanism remains in the firing position the movable core member moves repeatedly backward and forward; every time the movable core moves forward the shoulder of its part 20 impacts against the bearing plate 8 and produces a noise and vibration resembling the noise and vibration of a standard machine gun, the vibration being transmitted to the operator through the rear part 12 of the body of the gun.

When the trigger mechanism is actuated to fire the gun and the transformer primary circuit is repeatedly opened and closed in the manner above described, a current impulse is produced in the primary winding 69 of the transformer each time the movable core 20 moves into its forward position, so that a voltage impulse is induced in the secondary, a sufficiently high potential being thereby applied between the electrodes 89 and 114 to break down the electrical resistance of the paper target and the air gap between the target and the free end of the needle 114 to produce a mark by scorching the paper opposite the point where the free end of the needle is located. Normally a series of such scorch marks will be made in the recording target for each "burst" of firing.

In the embodiment of the invention illustrated in Figures 9a to 15 in which the dummy machine gun resembles a light Browning machine gun, use is made of an electric motor 210 for driving cam devices arranged to close and open the electric control circuit for operating the marking device, and to act on movable impact members for imitating the noise and vibration of a real machine gun.

The rear part of the body of the gun (Figures 10 and 11) comprises a channel-section frame 213 having a front wall 215, two intermediate 216, 217 and a rear wall 218, all of which are higher than its side walls 219, height of which is shown in Figure 3. The intermediate wall 216 and rear wall 218 are each provided with ribs 220 and 221, respectively, to which a top plate 222 is screwed. The rear of the barrel casing 201 is inserted in the front wall 215 and secured to the intermediate wall 216. 213a is a cover placed over the whole of the frame 213. The impact members 214, 214a, which are of rectangular section, are provided at their front ends with spindles 223, 224, respectively, which are let into them and secured thereto by means of screws, the said spindles passing through bearing bushes 225, 226 in the wall 216. Spindles 227, 228 are let into the opposite or rear ends of the impact members and are secured therein by means of screws, the said spindles passing through bearing bushes 229, 230 in the wall 217. The impact members are prevented from turning by the provision of a flat plate 214b between them and secured to one of them.

The mechanism for reciprocating the impact members comprises a vertical camshaft 231 having cams 232, 233 keyed thereon at 180° apart and located so as to act on the spindles 227, 228 once during each revolution of the camshaft. Forward movement of the impact members is opposed by coil springs 234, 235 which encircle the spindles 223, 224 and bear at one end against the impact members and at the other end against the flanges of the bushes 225, 226, respectively. The camshaft 231 is journalled at its upper end in a bearing bush 234 in the top plate 222 and at its lower end in a bearing bush 235 in the bottom wall of the frame 213, being supported therein by means of a collar 236 which rests on the bush 235. The camshaft is driven by means of a gear wheel 237 which meshes with a gear pinion 238 on a vertical driving shaft 239, the upper end of which is journalled in a bush 240 provided in a plate 241 which extends across a pair of lugs 242 projecting upwardly from the side walls 219 of the frame 213, the lower end of the said driving shaft passing through a bearing bush 243 in a bayonet socket 244 welded into the bottom of the frame 213. The lower end of the driving shaft 239 is provided with a tongue 245 which fits into a slot 246 in a coupling element 247 fixed on the end of the flexible shaft 211, the casing of which has a bayonet cap 248 secured thereto which is adapted to be engaged with the bayonet socket 244 for the purpose of maintaining the tongue in engagement with the slot in the coupling element 247. The pinion 238 (Figures 12 and 13) is fixed on a driven clutch element 249 which is loosely rotatable on the driving shaft 239, the upper end of which is of reduced diameter so as to form a shoulder serving for maintaining the clutch element 249 at the correct level on the driving shaft. The clutch element 249 co-operates with a driving clutch element 250 which is slidable on the shaft 239 but is prevented from rotating relatively thereto by means of a feather key 251. The clutch element 250 can be moved into and out of engagement with the clutch element 249 by means of a shifting fork 252 (Figure 11) pivoted on a pin 253 and passing through a slot 254 in the bottom of the rear wall 218, the pin 253 being fixed by its ends in two cheeks 255 integral with the rear wall 218 and extending rearwardly therefrom. The shifting fork 252 has a rearwardly and downwardly extending tail portion 258 which is adapted to be depressed by means of a lever 259 (see Figure 9b) actuated by the trigger 260 through the intermediary of a link 260a, the limbs of the shifting fork being provided with pins 256 (Figures 10 and 11) which engage in a circumferential groove 257 in the driving clutch element 250.

203 is a target stand (Figures 9a and 9b) comprising a wooden box on one end of which is erected a target frame 278. The other end of the target stand is provided with studs 204 to receive the eyes of hooks 205 which are adapted to engage the front legs 206, 207 of a simplified tripod, the said front legs, together with a rear leg 208 being connected together at their upper ends by a socket 209 to form an integral structure. By this means it is ensured that the gun is located at the proper distance from the target frame.

The lower part of the target frame 278 (see also Figure 14) consists of a rectangular structure comprising two horizontal bars 379 and two tubular uprights 378 to which the plate 277 is attached by means of screws 377, the said structure being held in position on the target stand 203 by means of lateral projections 400 on the uprights 378 and lateral extensions 401 of the lower horizontal bar 379, the said lugs and extensions fitting into guides 402 on the inside of the side walls 403 of the target stand. The upper part of the target frame comprises a pair of tubular uprights 404 to which a plate 405 is attached by means of screws 406, the said plate serving for carrying an aiming target 407. The upper part of the target frame is removably connected to the lower part by means of split studs 408 which are secured in the lower ends of the uprights 404 and are adapted to be inserted in the upper ends of the uprights 378.

The gun is provided with a foresight 409 and a backsight 410 to enable it to be trained on the aiming target, the tripod head 346 being arranged to swivel around a post 411 which is secured at the required height in the socket 209 by means of a clamping screw 412. The elevation of the gun is adjusted by means of a hand-wheel 414 fixed on a screw spindle 315.

Referring now to the electrical control of the apparatus, a three-point connector 261 (Figure 9a) is mounted on the side of the target stand, two of the connecting points viz. 262 and 263 being connected to an electric supply, and the other one being grounded (Figure 15). The connecting points 262, 263 are connected to two conductors 264, 266 of a five-day cable 269, a conductor 265 thereof being connected to ground, 267 to one end of the primary winding 269 of a transformer 202 mounted in the target stand, while the fifth conductor 268 is connected to one input terminal 271 (Figures 9a, 9b and 15) of the electric motor 210 provided in this construction for the drive of the impact members through the intermediary of the cams, gears and flexible shaft above referred to, and also mounted on the target stand. The connecting point 263 is also connected to the other input terminal 272 of the electric motor by a conductor 273 and to the other end of the transformer primary 269 by a conductor 274. The one end of the transformer secondary 270 is connected by a conductor 275 to a metal plate 277 mounted on the lower half of the target frame 278, whilst its other end is earthed at 276. The conductors 264, 265, 266, 267 and 268 (Figures 11 and 15) are connected, respectively, to the pins 279, 280, 281, 282 and 283 of a five-pin plug 284 which is adapted to be inserted in a five-pin socket base 289 fixed on a plate 290 which is attached by screws 291 to the underside of the frame 213 (see Figure 11). The pins 292, 293, 294, 295, and 296 of the socket base 289 (see also Figure 15) are adapted to receive the pins 279, 280, 281, 282 and 283 of the plug 284, respectively.

The plate 290 has an upwardly extending rectangular boss 297 integral therewith, on which are mounted three pairs of superposed spring contacts 298, 299 and 300 which are secured to the boss 297 by means of screws 304 which pass through insulating bushes 305 which insulate the spring contacts of each pair from one another. Strips of insulating material 306 are provided on the outer sides of each of the spring contacts, and the contacts of each pair are separated from each other by means of plates 307 of insulating material. The heads of the screws 304 bear against metal clamping plates 308. The bottom wall of the frame 213 is provided with an opening 309 to enable the spring contacts to be inserted and removed from the frame together with the plate 290.

Referring to the diagram in Figure 15 and to Figures 9a, 9b, 10 and 11, the lower contact 298 and upper contact 300 are connected to one another by a conductor 310 and to the pin 296 of the socket base 289 by a conductor 313, the upper contact 298 and upper contact 299 being connected to one another by a conductor 312 and by a conductor 315 to one end of the electromagnet 316, the other end of which is connected by a conductor 318 to pin 294. The electromagnet 317 carrying the winding 316 is mounted on a frame 319 fixed to the muzzle end of the barrel casing 201. The lower contact 299 is connected by a conductor 314 to the pin 295 and the lower contact 300 is connected by a conductor 311 to pin 292. The electromagnet 317 (see Figure 9) coacts with an armature 320 which is connected by a link 321 to a lever 322 suspended from the frame 319 on a pivot 323, and the lower end of which carries the marking needle 324. The needle 324 is clamped to a lever 325 pivoted at 326 to the lever 322. In order that the marking needle shall lie opposite a point on the marking target 407a corresponding exactly to the point on the aiming target independently of the movement of the machine gun, the lever 325 carrying the needle is under the control of a movable rod 327 movable in guides 327a, one end of which acts on the lever 325 whilst its other end coacts with an arcuate cam surface 328 fixed on the frame 319 which is attached to the gun. When the lever 322 and rod 327 are swung about the pivot 323, upon actuation of the armature 320, the rod 327 is displaced longitudinally by the cam surface 328 and in so doing the lever 325 is turned about the pivot 326 thereby maintaining the needle 324 in fixed angular relation to the marking target engaging the plate 277.

Referring to the means for closing the contacts, (see Figures 10 and 11), a rearwardly extending lever 329, which is fixed on a spindle 330 journalled in the side walls of the frame 213, has at its free end an offset part 331 which rests on one of the limbs of the shifting fork 252 so as to be raised by the latter when the fork is rocked upwardly to engage the clutch element 250 with the clutch element 251. The spindle 330 has a forwardly extending lever arm 332 fixed thereon, the free end of which lies above the spring contacts 298, so that when the lever 329 is raised the lever arm 332 depresses the upper contact 298 into engagement with the lower contact 298 so that if the pins 262, 263 of the socket base 261 (Figure 9a) are at the same time connected to an electric supply system, a circuit is closed from the pin 263, through conductor 266, pins 281, 294, conductor 318; electromagnet winding 316, conductor 315, contacts 298, conductor 310, contacts 300, pins 292, 279, conductor 264, and pin 262.

A lever arm loosely mounted on the spindle 330, has one arm 334 arranged to operate the contacts 299 whilst its other arm 336 is acted upon by a rod 338 passing through it and which also passes through one arm 339 of an angle lever 339, 340 which is pivoted on a pin 341 fixed in the bottom of the frame 213, driving connection being established between the rod 338 and the lever arms 336 and 339 by means of pins 337 let into the rod on either side of the said lever arms. The lever arm 340 coacts with a pair of cams 342 fixed on the collar 236 which is keyed on the shaft 231, so that during each revolution of the said shaft the lever arm 340 is rocked twice by the cams 342 and the lever arm 334 depresses the upper contact 299 into engagement with the lower contact 299, whereby the transformer circuit is closed as follows: from the pin 262 of the socket base 261 through the conductor 264, pins 279, 292 and conductor 311 to the contacts 300, closed by a safety catch as hereinafter described, and through the conductor 310 to the contacts 298; then through the contacts 299, conductor 314, pins 295, 282 and conductor 267 to the contact 269, transformer primary and conductor 274 to pin 263, whereby the primary circuit of the transformer is closed and a current is induced in the secondary of the transformer, the secondary circuit of which is as follows: from the one end of the secondary 270, the other end of which is grounded at 276, through conductor 275 to target carrier 277, spark gap 277a, marking needle 324, lever 322 and to earth as shown at 322a. The pin 293 on the base 289 is in contact with the gun and by its engaging with the pin 280 which is grounded, through the conductor 265, the gun is grounded.

On the spindle 330 there is also rotatably mounted a lever 335, which is adapted to close the contacts 300 of a switch by which the electric motor is started, the said switch being also inserted in the circuit of the electromagnet 316 used in connection with the marking needle and in the primary circuit of the transformer, as already above referred to. The sleeve through which the lever 335 is mounted on the spindle has secured to it a lever arm 333 adapted to be actuated by a pin 500 attached to the sliding member 501 of a safety catch mounted on the outside casing 213a of the rear part 212 of the gun. When the upper contact 300 is depressed by the lever 335 to close the switch, the following circuit is closed: from pin 263, through conductor 273, motor 210, conductor 268, pins 283, 296, conductor 313, conductor 310, contacts 300, conductor 311, pins 292, 279, conductor 264, to pin 262.

The bottom wall of the frame 213 is provided with lugs 344 and 345 for mounting the gun on the tripod head 346 (see Figure 11), the rear lug 345 being connected at 347 to a rocker member 348 comprising two side members 349 which are connected together by means of a transverse wall 350 integral therewith. The wall 350 extends upwardly through a slot 351 in the bottom wall of the frame 213 and is provided with apertures through which the spindle 228 and the rod 338 pass with play. The rocker member 348 is attached to the tripod head by means of a pin 352 which passes through a tube 353 extending between and integral with the side walls 349 behind the wall 350. By this means the gun body is capable of rocking about the pivot pin 354 by which the lug 344 is attached to the tripod head. The extent of this rocking movement is limited by means of a stud 355 screwed into the bottom wall of the frame 213 and the lower end of which bears against the tube 353. The stud 355 is adjusted by inserting a tommy bar into a hole 356 therein and secured in its adjusted position by means of a lock-nut 357. The upwardly extending part of the wall 350 lies in the path of the impact member 214 so that during each rearward movement it receives a blow from the latter, thereby causing the rocking member 348 to swing in the clockwise direction around the pin 352 so that the rear part of the gun body receives an upward jolt similar to that produced during the firing of a shot from a real machine gun.

The operation of this form of construction is as follows: By sliding the safety catch member 501, the lever 335 is actuated and caused to close the motor switch 300, and thereby start the motor. As soon as the trigger is operated, the shaft 239 is clutched to the flexible shaft 211 driven by the motor. At the same time the lever 329 is caused to actuate the lever arm 332 to close the contacts 298 by which the circuit of the electromagnet 317, 316 is closed and the marking needle 324 caused to be brought into its operative position. The cam shaft 231 being now continuously driven by the shaft 239 so long as the trigger is in the operative position, the cams 342 intermittently operate the crank lever 334, 336 through the lever 339, 340 and the rod 338, thereby closing the switch 299 of the primary circuit of the transformer, and by inducing a current of adequate voltage in the secondary of the transformer, producing a spark discharge and repeatedly marking the target. Simultaneously therewith the impact members 214, 214a, are actuated by the cams 232, 233 to imitate the noise and vibrations of a real gun.

We claim:

1. A training apparatus comprising a dummy machine gun, a target carrier associated with the gun and carrying the target, a target marking member, means for causing the marking member to move over the target in conformity with the movement of the gun, trigger control means for repeatedly rendering the marking member operative to mark the target while the trigger is maintained in operative position, said means for rendering the marking member operative including: an electric control circuit arranged to be repeatedly closed and opened while the trigger is in operative position; and an electric marking circuit controlled by the said control circuit and including the marking member and a metal plate constituted by the target carrier, the closing of said marking circuit producing a spark discharge between the marking member and metal plate serving to mark the target on the carrier.

2. A training apparatus comprising a dummy machine gun, a target carrier associated with the gun and carrying the target, a target marking member, means for causing the marking member to move over the target in conformity with the movement of the gun, trigger control means for repeatedly rendering the marking member operative to mark the target while the trigger is maintained in operative position, said means for rendering the marking member operative including: an electric control circuit arranged to be repeatedly closed and opened while the trigger is in operative position, and comprising an electromagnet having a winding which forms part of the control circuit and a movable core, a switch member connected to the movable core and adapted when the trigger is held in the operative position to be moved by the movable core to open the control circuit, and spring means for returning the movable core and switch member to close again the control circuit as often as the latter is broken, until the trigger is released; and an electric marking circuit controlled by the said control circuit and including the marking member and a metal plate constituted by the target carrier, the closing of said marking circuit producing a spark discharge between the marking member and metal plate serving to mark the target on the carrier.

3. A training apparatus comprising a dummy machine gun, a target carrier associated with the gun and carrying the target, a target marking member, means for causing the marking member to move over the target in conformity with the movement of the gun, trigger control means for repeatedly rendering the marking member operative to mark the target while the trigger is maintained in operative position, said means for rendering the marking member operative including: an electric control circuit arranged to be repeatedly closed and opened while the trigger is in operative position; and comprising an electromagnet having a winding which forms part of the control circuit and a movable core, a switch member connected to the movable core and adapted when the trigger is held in the operative position to be moved by the movable core to open the control circuit, and spring means for returning the movable core and switch member to close again the control circuit as often as the latter is broken, until the trigger is released; and an electric marking circuit controlled by the said control circuit and including the marking member and a metal plate constituted by the target carrier, the closing of said marking circuit producing a spark discharge between the marking member and metal plate serving to mark the target on the carrier and impact surfaces on the dummy gun against which the said movable core can impact at the ends of its movements to imitate the noise and vibration produced by the firing of a real automatic gun.

4. A training apparatus comprising a dummy machine gun, a target carrier associated with the gun and carrying the target, a target marking member, means for causing the marking member to move over the target in conformity with the movement of the gun, trigger control means for repeatedly rendering the marking member operative to mark the target while the trigger is maintained in operative position, said means for rendering the marking member operative including: an electric control circuit arranged to be repeatedly closed and opened while the trigger is in operative position; and an electric marking circuit controlled by the said control circuit and including the marking member and a metal plate constituted by the target carrier, which electric marking circuit includes a spark gap between the marking member and the metal plate constituting the target carrier in which a spark discharge is produced to mark the target.

5. A training apparatus comprising a dummy machine gun, a target carrier associated with the gun and carrying the target, a target marking member, means for causing the marking member to move over the target in conformity with the movement of the gun, trigger control means for repeatedly rendering the marking member operative to mark the target while the trigger is maintained in operative position, said means for rendering the marking member operative including: an electric control circuit arranged to be repeatedly closed and opened while the trigger is in operative position, and an electric marking circuit controlled by the said control circuit and including the marking member and a metal plate constituted by the target carrier, the target comprising two target sheets arranged back to back on the said metal plate in accurate alignment and one serving to be aimed at and being a mirror image of the other which serves as a recording target, and the said electric marking circuit including a spark gap between the marking member and the mettal plate in which a spark discharge is produced to mark the recording target.

6. A training apparatus comprising a dummy machine gun, a target carrier associated with the gun and carrying a target, a target marking member, means for moving the marking member over the target in conformity with the movement of the gun, trigger controlled means for repeatedly rendering the marking member operative to mark the target while the trigger is maintained in operative position, a target frame in which the target carrier is mounted, a tripod supporting the target frame, and a swivel connection between the dummy gun and the said tripod.

7. A training apparatus comprising a dummy machine gun, a target carrier associated with the gun and carrying a target, a target marking member, means for moving the marking member over the target in conformity with the movement of the gun, trigger controlled means for repeatedly rendering the marking member operative to mark the target while the trigger is maintained in operative position, means on the dummy machine gun for imitating the noise and vibration produced in the firing of a real automatic gun, the rear part of the dummy gun being loosely mounted in its front part for the purpose of increasing the effect of the vibrations produced by the said means.

8. A training apparatus comprising a dummy machine gun, a target carrier associated with the gun and carrying a target, a target marking member, means for moving the marking member over the target in conformity with the movement of the gun, trigger controlled means for repeatedly rendering the marking member operative to mark the target while the trigger is maintatined in operative position, an electric motor, in which the means for rendering the marking member operative comprise: a cam operated by the electric motor so long as the trigger is in operative position; an electric control circuit arranged to be peatedly closed and opened by the said cam; and an electric marking circuit controlled by the said control circuit and including the marking member and a metal plate constituted by the target carrier, the closing of said marking circuit producing a spark discharge between the marking member and metal plate serving to mark the target on the carrier.

9. A training apparatus comprising a dummy machine gun, a target carrier associated with the gun and carrying a target, a target marking member, means for moving the marking member over the target in conformity with the movement of the gun, trigger controlled means for repeatedly rendering the marking member operative to mark the target while the trigger is maintained in operative position, means on the dummy machine gun for imitating the noise and vibration produced in the firing of a real automatic gun, the said means consisting of at least one movable impact member, and at least one fixed impact surface in combination with an electric motor; and a cam operated by the electric motor repeatedly to act on the impact member.

10. A training apparatus comprising a dummy machine gun, a target carrier associated with the gun and carrying a target, a target marking member, means for moving the marking member over the target in conformity with the movement of the gun, trigger controlled means for repeatedly rendering the marking member operative to mark the target while the trigger is maintained in operative position, means on the dummy machine gun for imitating the noise and vibration produced in the firing of a real automatic gun, the said means consisting of at least one movable impact member, at least one fixed impact surface, and a spring acting on the movable impact member to cause the latter to strike against the fixed impact surface in combination with an electric motor; and a cam operated by the electric motor repeatedly to act on the impact member.

ZYGMUNT DE LUBICZ-BAKANOWSKI.
RICHARD SUK.